United States Patent
Matsuoka et al.

(10) Patent No.: US 8,360,189 B2
(45) Date of Patent: Jan. 29, 2013

(54) MOTORCYCLE FRAME HAVING PROTECTED SPACE THEREIN, AND MOTORCYCLE INCORPORATING SAME

(75) Inventors: Yosuke Matsuoka, Saitama (JP); Arihide Tsujimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 226 days.

(21) Appl. No.: 12/874,394

(22) Filed: Sep. 2, 2010

(65) Prior Publication Data
US 2011/0061960 A1    Mar. 17, 2011

(30) Foreign Application Priority Data
Sep. 15, 2009 (JP) ................. 2009-212983

(51) Int. Cl.
*B60K 1/00* (2006.01)
(52) U.S. Cl. .................. 180/220; 180/219
(58) Field of Classification Search .......... 180/220, 180/218, 219; 296/203.01
See application file for complete search history.

(56) References Cited

U.S. PATENT DOCUMENTS

| 6,598,693 | B2 * | 7/2003 | Honda et al. | 180/206.5 |
| 2002/0029919 | A1 * | 3/2002 | Patmont et al. | 180/220 |
| 2005/0177285 | A1 * | 8/2005 | Honda | 701/22 |
| 2005/0217910 | A1 * | 10/2005 | Yonehana et al. | 180/68.5 |

FOREIGN PATENT DOCUMENTS
JP        3686076 B2    6/2005

* cited by examiner

*Primary Examiner* — Tony Winner
(74) *Attorney, Agent, or Firm* — Carrier Blackman & Associates, P.C.; William D. Blackman; Joseph P. Carrier

(57) ABSTRACT

A motorcycle includes a main frame member having a front half section extending downward and rearward from a head pipe, and a rear half section extending rearwardly from a lower end of this front half section. A vehicle body part is provided for covering portions of this main frame member. In the motorcycle, the main frame member includes left and right sidewall parts as well as a bottom wall part, and is opened upward. The vehicle body cover is provided so as to cover, from above, an opened portion of the main frame member and a portion of each of the left and right sidewall parts. A lower portion of the rear half section is exposed to the outside as an external appearance design surface.

15 Claims, 10 Drawing Sheets

MOTORCYCLE FRAME HAVING PROTECTED SPACE THEREIN, AND MOTORCYCLE INCORPORATING SAME

CROSS-REFERENCE TO RELATED APPLICATIONS

The present invention claims priority under 35 USC 119 based on Japanese patent application No. 2009-212983, filed on Sep. 15, 2009. The entire subject matter of this priority document, including specification claims and drawings thereof, is incorporated by reference herein.

BACKGROUND OF THE INVENTION

1. Field of the Invention

This invention relates to motorcycles, and particularly to electric motorcycles. In particular, the invention relates to an electric motorcycle having an improved frame with a protected space formed therein.

2. Description of the Background Art

A type of motorcycle is known in which a cast frame structure is used from a viewpoint of reducing the vehicle weight and enhancing the productivity (see Patent Document 1). [Patent Document 1] Japanese Patent No. 3686076

The conventional motorcycle mentioned above has a structure in which the cast frame is opened downward; the upper side of the frame is exposed to the outside to be used as an external appearance part; and the inside of the frame is used as a section for accommodating parts.

Furthermore, if the cast frame is thus exposed as the external appearance design surface, the cast frame needs to be subjected to surface finishing such as coating and plating. If an upper area (straddling section) of the frame, which is easily seen, is exposed to the outside, costs for performing surface finishing on the exposed area tends to become higher, because the external appearance needs to be enhanced in order to maximize visual appeal.

On the other hand, members installed inside the frame need to be accessed from the lower side of the frame, when maintenance of such members is performed. For this reason, a motorcycle having a frame with improved accessibility is needed.

SUMMARY OF THE INVENTION

With the above-described background being taken into consideration, an object of this invention is to provide a motorcycle whose costs for surface finishing can be kept low even when the portion of the frame is used as the external appearance design surface, and whose maintainability can be enhanced.

In order to achieve the above object, a motorcycle according to a first aspect of the invention includes: a main frame member (such as main frame member MF in the embodiment) having a front half section (such as front half section MF1 in the embodiment) extending downward and rearward from a head pipe (such as head pipe 2 in the embodiment), and a horizontal section (such as rear half section MF2 in the embodiment) extending rearward from a lower end of this front half section; and a vehicle body cover (such as vehicle body cover 27 in the embodiment) covering a part of this main frame member, the motorcycle characterized in that: the main frame member is a member which includes left and right sidewall parts (such as sidewall parts 51 in the embodiment) as well as a bottom wall part (such as bottom wall part 52 in the embodiment), and is opened upward; the vehicle body cover is provided to cover from above the opened portion of the main frame member and a portion of each of the left and right sidewall parts; and as an external appearance design surface, a lower portion of the horizontal section is exposed to the outside.

A motorcycle according to a second aspect of the invention includes those features described above in connection with the first aspect, and also includes additional features including a motor (such as front wheel motor FM and rear wheel motor RM in the embodiment) for imparting a driving force to a driving wheel (such as front wheel FW and rear wheel RW in the embodiment); and a battery (such as driving batteries 60 to 62 in the embodiment) for supplying an electric power to the motor, the motorcycle characterized in that the battery is accommodated in a space (such as space 58 in the embodiment) formed by the left and right sidewall parts as well as the bottom wall part of the main frame member.

A motorcycle according to a third aspect of the invention includes those features described above in connection with the second aspect, and also includes additional features including multiple projecting rails (such as projecting rails 69 in the embodiment) provided on an external side wall of each of the left and right sidewall parts, the projecting rails each projecting outward and extending in a front-rear direction.

A motorcycle according to a fourth aspect of the invention includes those features described above in connection with the second aspect, and also includes additional features including a swing arm (such as swing arm 22 in the embodiment) for rotatably supporting the driving wheel, the motorcycle characterized in that: recessed parts (such as recessed parts 85 in the embodiment) for accommodating portions of the swing arm are provided in the sidewall parts in the horizontal section of the main frame member, respectively; and a pivot part (such as pivot part 23 in the embodiment) for swingably supporting the swing arm is provided in each of the recessed parts.

A motorcycle according to a fifth aspect of the invention includes those features described above in connection with the second aspect, and also includes additional features including a front cover (such as front cover 28 in the embodiment) for covering the front half section and portions of the horizontal section of the main frame member; and a rear cover (such as rear cover 29 in the embodiment) for covering remaining portions of the horizontal section.

A motorcycle according to a sixth aspect of the invention includes those features described above in connection with the second aspect, and also includes additional features including a motor driver unit (such as motor driver unit 66 in the embodiment) for controlling the motor; and a voltage converter (such as voltage converter 65 in the embodiment) for lowering a voltage of the battery, characterized in that the motor driver unit and the voltage converter are placed above the battery (such as driving batteries 61, 62 in the embodiment) which is accommodated in the horizontal section of the main frame member.

A motorcycle according to a seventh aspect of the invention includes those features described above in connection with the fifth aspect, and also includes additional features including an opening (such as opening 41 in the embodiment) made in a rear surface (such as rear surface 40 in the embodiment) of the front cover; a power supply part (such as power supply connector 42 in the embodiment) for charging the battery and a cooling air inlet (such as cooling air inlet 43 in the embodiment) for cooling the battery are provided in a location seen from the opening; and a lid (such as lid 44 in the embodiment) for covering the opening so as to be openable and closable is provided.

According to the first aspect of the invention, the external appearance quality of the main frame member can be enhanced by exposing portions of the main frame member and using the exposed portions thereof as design accents. In addition, the invention enables maintenance to be easily provided to the inside of the main frame member once the vehicle body cover, mounted over the main frame member, is removed. In addition, because the vehicle body cover is provided to cover from above an opened portion of the main frame member as well as portions of the respective left and right sidewall parts, external appearance design surfaces of the main frame member are not set up in an upper area of the main frame member which is less likely to be seen. For this reason, costs for performing surface finishing on the exposed portions of the main frame member can be kept lower than when external appearance design surfaces are set up in the upper area of the main frame member.

According to the second aspect of the invention, the batteries can be protected from the outside, because the batteries are placed in an area surrounded by the main frame member.

According to the third aspect of the invention, strength of the main frame member is increased, and radiation of heat from the batteries stored therein is facilitated.

According to the fourth aspect of the invention, the vehicle can be made compact in the widthwise direction, and a slim design can be realized. That is because the swing arm no longer juts out from the main frame member as a result of accommodating portions of the swing arm in the respective recessed parts.

According to the fifth aspect of the invention, parts can be reduced in number, because the vehicle body cover is made up of the front cover and the rear cover.

According to the sixth aspect of the invention, it is possible to simultaneously cool the motor driver unit, the batteries and the voltage converter, which are all members producing heat.

According to the seventh aspect of the invention, the batteries can be charged, and maintenance can be provided to the cooling air inlet, only by opening and closing the lid.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Descriptions will be provided below of selected illustrative embodiments of the present invention provided as examples of the present invention, supported by and shown in the accompanying drawings. It should be understood that only structures considered necessary for clarifying the present invention are described herein. Other conventional structures, and those of ancillary and auxiliary components of the system, will be known and understood by those skilled in the art.

In the following detailed description, relative positional terms such as "front", "right side" and "left side" correspond to those directions considered from the vantage point of a vehicle operator, seated in the driver's seat and facing forwardly.

In the following described embodiment, a motorcycle 1 is an electric motorcycle, in which both the front and rear wheels are configured as driving wheels. As shown in FIGS. 1 to 5, the motorcycle 1 has an aluminum cast steering frame 3 at a head pipe 2 configured and arranged in such a way that the steering frame 3 can be pivotally steered. The head pipe 2 is provided at a front end of a main frame member MF. The steering frame 3 extends obliquely forward and downwardly from the head pipe 2.

Figure 1:
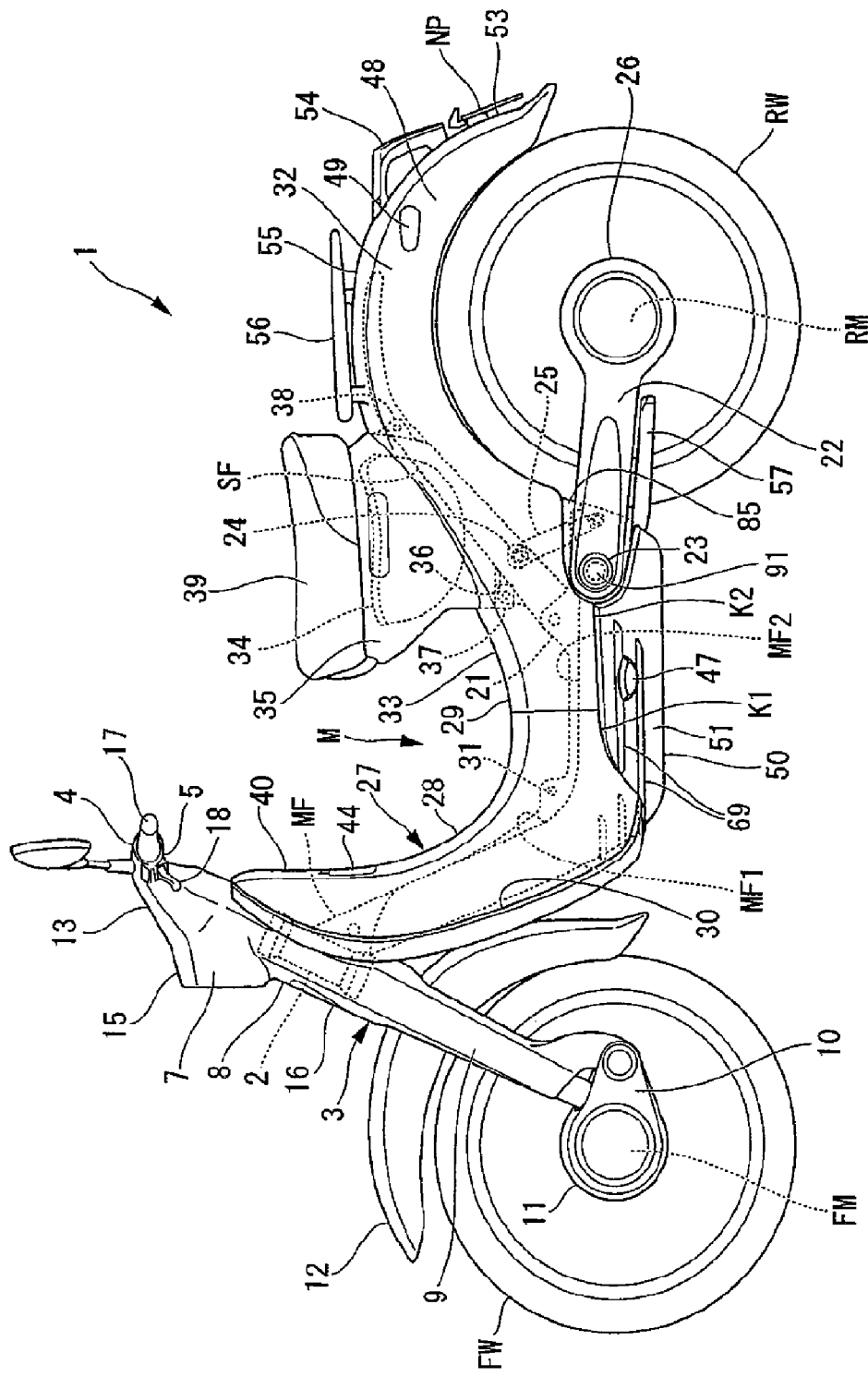
FIG. 1 is a left side view of a motorcycle according to an embodiment of this invention.
Figure 2:
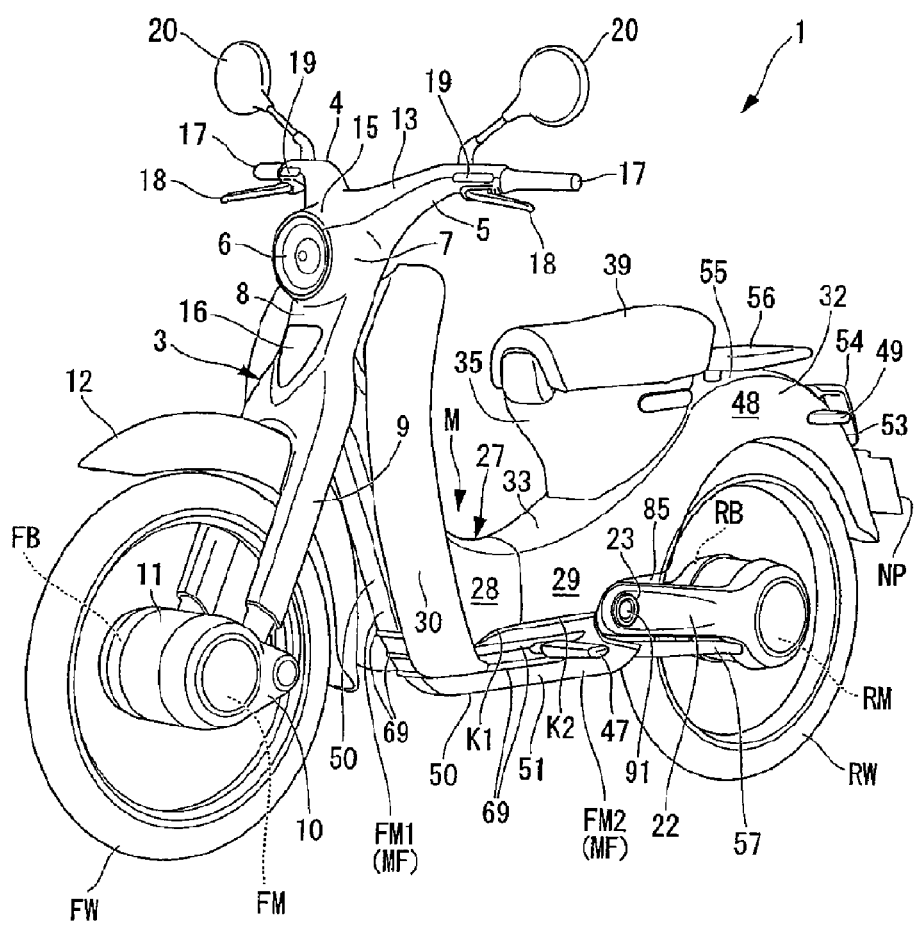
FIG. 2 is a perspective view of the motorcycle according to the embodiment of this invention, which is viewed from the left front.
Figure 3:
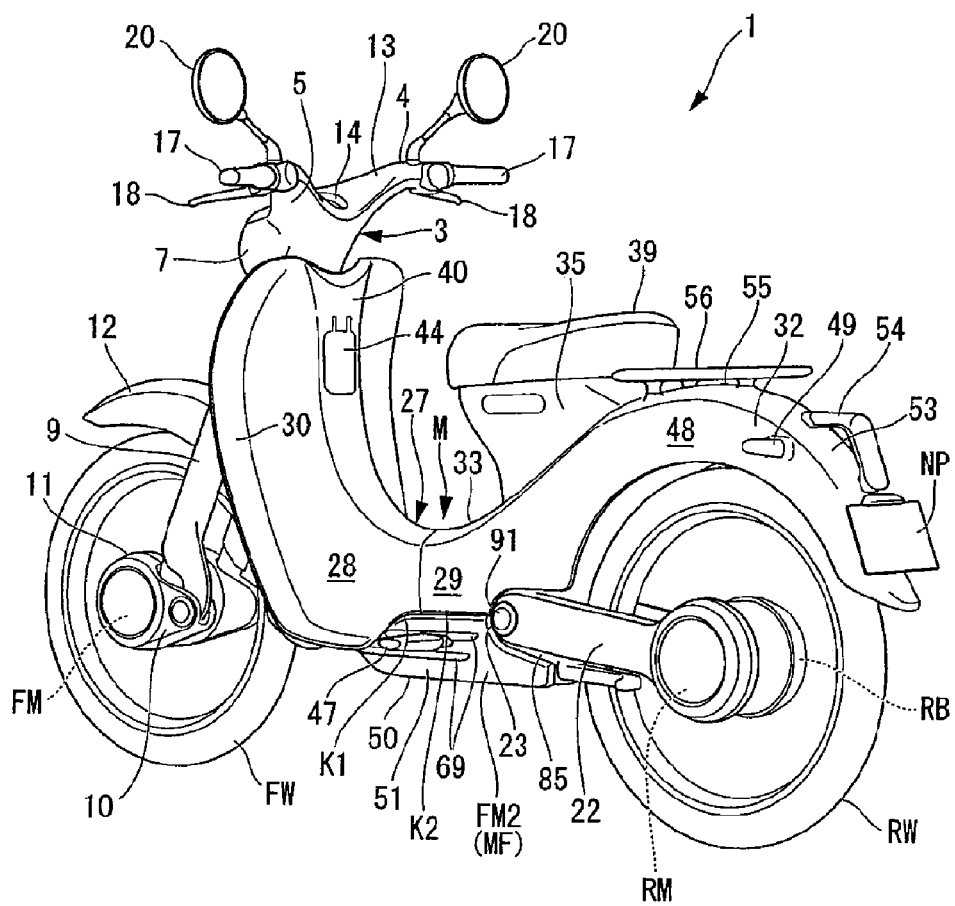
FIG. 3 is a perspective view of the motorcycle according to the embodiment of this invention, which is viewed from the left rear.

As shown in FIG. 2, the steering frame 3 has, at an upper portion thereof, left and right handle base parts 5, an arc-shaped headlight fixture part 7, and a front wall part 8. The left and right handle base parts 5 constitute a lower portion of a handle 4. The headlight fixture part 7 extends obliquely downward from the two handle base parts 5 to a front central area of the steering frame 3, and holds a headlight 6 therein. A front wall part 8 is disposed under the headlight fixture part 7.

A lower portion of the steering frame 3 below the front wall part 8 is divided into two parts formed as left and right front fork parts 9. A front wheel FW is pivotally supported by lowermost end portions of the front fork parts 9 with a bottom link suspension 10 interposed in between. A front wheel motor FM for imparting a driving force to the front wheel FW is installed in the left side of a hub part 11 of the front wheel FW, and a hydraulic drum front brake FB is installed in the right side of the hub part 11. Note that the installation locations of the front brake FB and the front wheel motor FM may be reversed left right.

A resin front fender 12 for covering the front wheel FW from above is installed between the two front fork parts 9, 9. A resin instrument cover 13 is mounted on the handle base part 5 extending leftward and rightward from an upper portion of the steering frame 3. The instrument cover 13 together with the handle base part 5 constitutes the handle 4, and a meter is placed in the center portion of the instrument cover 13. A widthwise center portion of the instrument cover 13 extends frontward, and together with the headlight fixture part 7, forms a headlight cover 15 surrounding the headlight 6. The headlight 6 is installed within the headlight cover 15.

Figure 4:
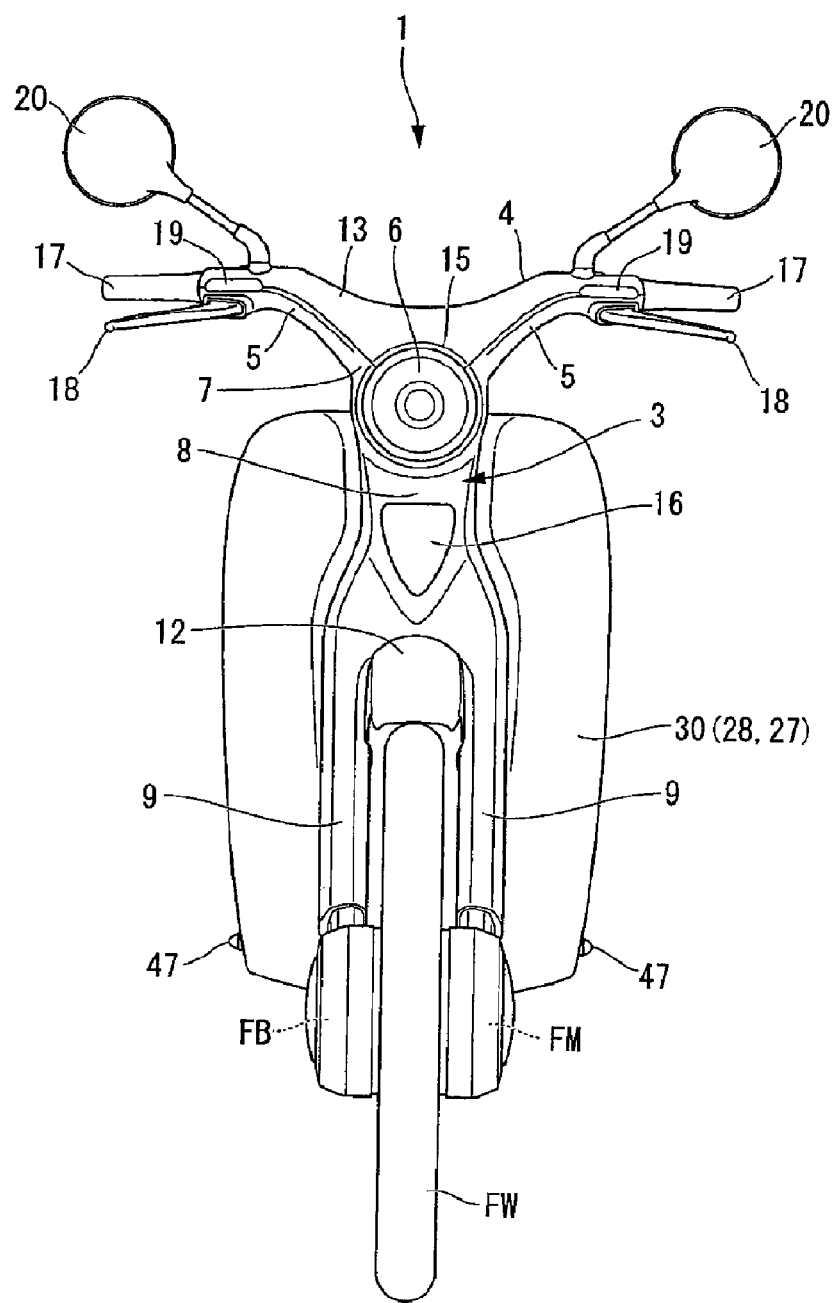
FIG. 4 is a front view of the motorcycle according to the embodiment of this invention.
Figure 5:
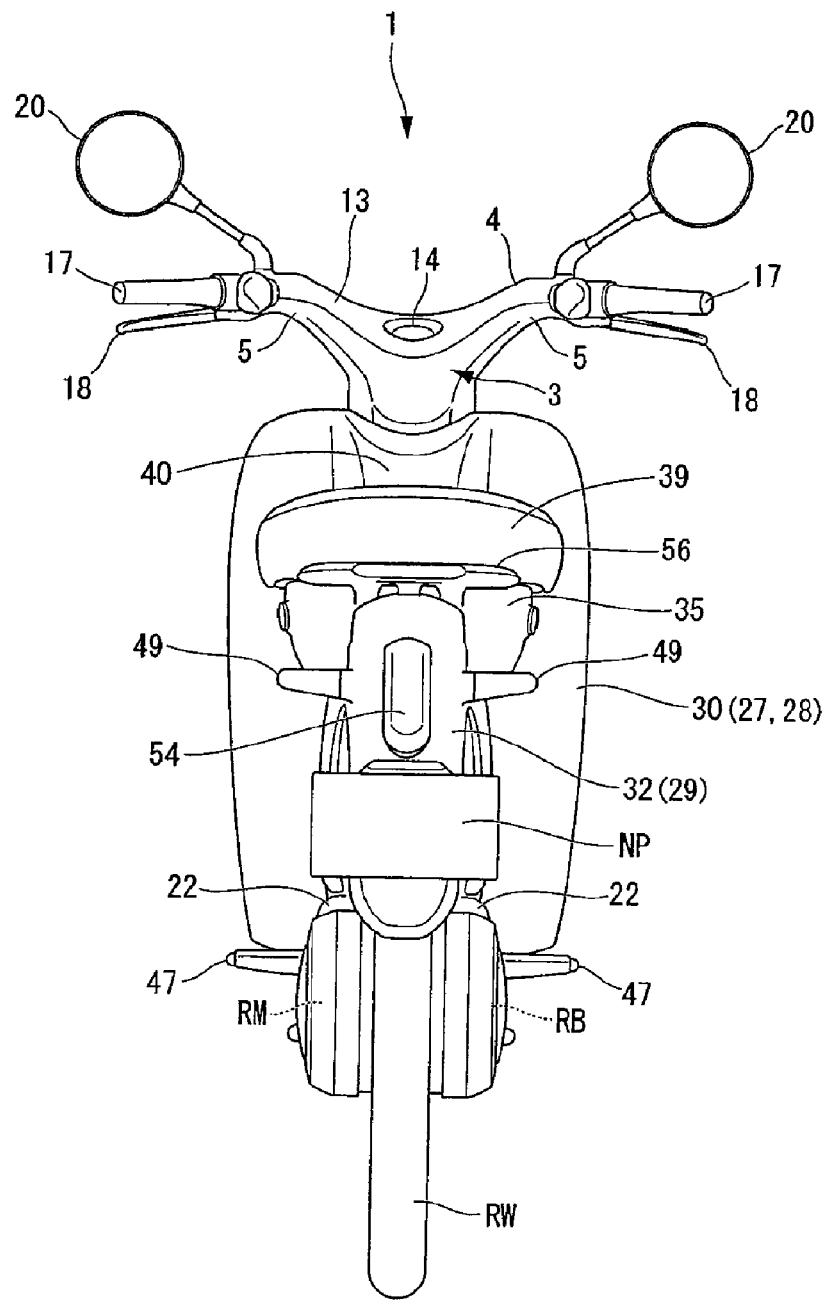
FIG. 5 is a rear view of the motorcycle according to the embodiment of this invention.

A triangular information display part 16 having a vertex thereof directed downward is installed in the front wall part 8 of the steering frame 3 (see FIGS. 2 and 4). This information display part 16 is constructed in that a display unit such as a liquid crystal display is installed inside a transparent lens. The information display part 16 is used to send a message in the form of characters, symbols and the like to oncoming vehicles and pedestrians.

Handlegrips 17, 17 are respectively attached to each of the left and right end portions of the handle 4, and brake levers 18 supported by the left and right handle base parts 5 are installed in front lower sides of the handlegrips 17, respectively. Horizontally-long left and right turn signal indicator lights 19, 19, which stretch across the boundary between the handle base parts 5 and the instrument cover 13, are installed in the two end portions of the handle 4, respectively. Rear-view mirrors 20, 20 are attached to left and right base portions of the handlegrips 17, respectively.

The main frame member MF is an aluminum cast member which extends obliquely downwardly and rearwardly from the head pipe 2, and which thereafter extends horizontally and rearwardly. Supplemental frame sections SF are respectively fixed to left and right rear brackets 21 provided on a rear end portion of the main frame member MF. The supplemental frame sections SF are members which extend obliquely upward and rearward.

A two-pronged swing arm 22 is swingably supported by a pivot part 23 at a rear portion of the main frame member MF. The rear wheel RW is rotatably supported by the swing arm 22. A cross member 24 extends between, and is fitted to the left and right supplemental frame sections SF, and a shock absorber 25 is installed between the cross member 24 and a base portion of the swing arm 22 (see FIGS. 1 and 6).

A rear wheel motor RM for imparting a driving force to the rear wheel RW is installed in the left side of a hub part 26 of the rear wheel RW, and a hydraulic drum rear brake RB is installed in the right side of the hub part 26. Note that the installation locations of the rear wheel brake RB and the rear wheel motor RM may be reversed left right as in the case of the front wheel FW.

A vehicle body cover 27 is mounted on an area stretching from the main frame member MF to the supplemental frame section SF. This vehicle body cover 27 is formed of, for example, a resin member compatible in design with the instrument cover 13 mounted on the handle base parts 5 of the steering frame 3, and the quality of whose resin is the same as the quality of the resin of the instrument cover 13. The vehicle body cover 27 includes: a front cover 28 for covering a front half section MF1 of the main frame member MF and a portion of a rear half section MF2 of the main frame member MF; and a rear cover 29 for covering the remaining portion of the rear half section MF2 and a rear portion of the vehicle body.

The front cover 28 unitarily includes a leg shield part 30 that covers the front half section MF1 of the main frame member MF from the rear and above. A front portion of the leg shield part 30 stretches out in the vehicle-width direction. The front cover 28 is fixed to a front bracket 31 of the main frame member MF. The rear cover 29 is formed as a rear fender part 32 that covers a portion of the rear half section MF2 of the main frame member MF from above, and extends an upper wall 33 obliquely rearward. A rear portion of the rear fender part 32 covers the rear wheel RW from above. A storage box 35 capable of storing a helmet 34 and the like is attached to the upper wall 33 of the rear cover 29. The storage box 35 is attached by fixing fixture pieces 37, 38 to a fixture bracket 36 of the supplemental frame section SF and to a rear portion of the supplemental frame section SF, respectively. A seat 39 is attached to the storage box and arranged to cover an opening formed in an upper portion of the storage box 35. The seat 39 is pivotally attached to a wall portion of the storage box 35, and is arranged so as to be openable and closable about a front side of the opening.

The leg shield part 30 of the front cover 28 covers the main frame member MF from the rear, and makes a forwardly directed portion of a bottom wall part 50 of the main frame member MF, exposed frontward. A rear portion of the front cover 28 makes the bottom wall part 50 in the rear half section MF2 of the main frame member FM exposed downward. In addition, the rear portion of the front cover 28 makes side wall parts 51 in the rear half section MF2 of the main frame member FM exposed under lower edge parts K1. Each of the lower edge parts K1 of the front cover 28 is formed extending obliquely upward in a rising manner.

Figure 8:
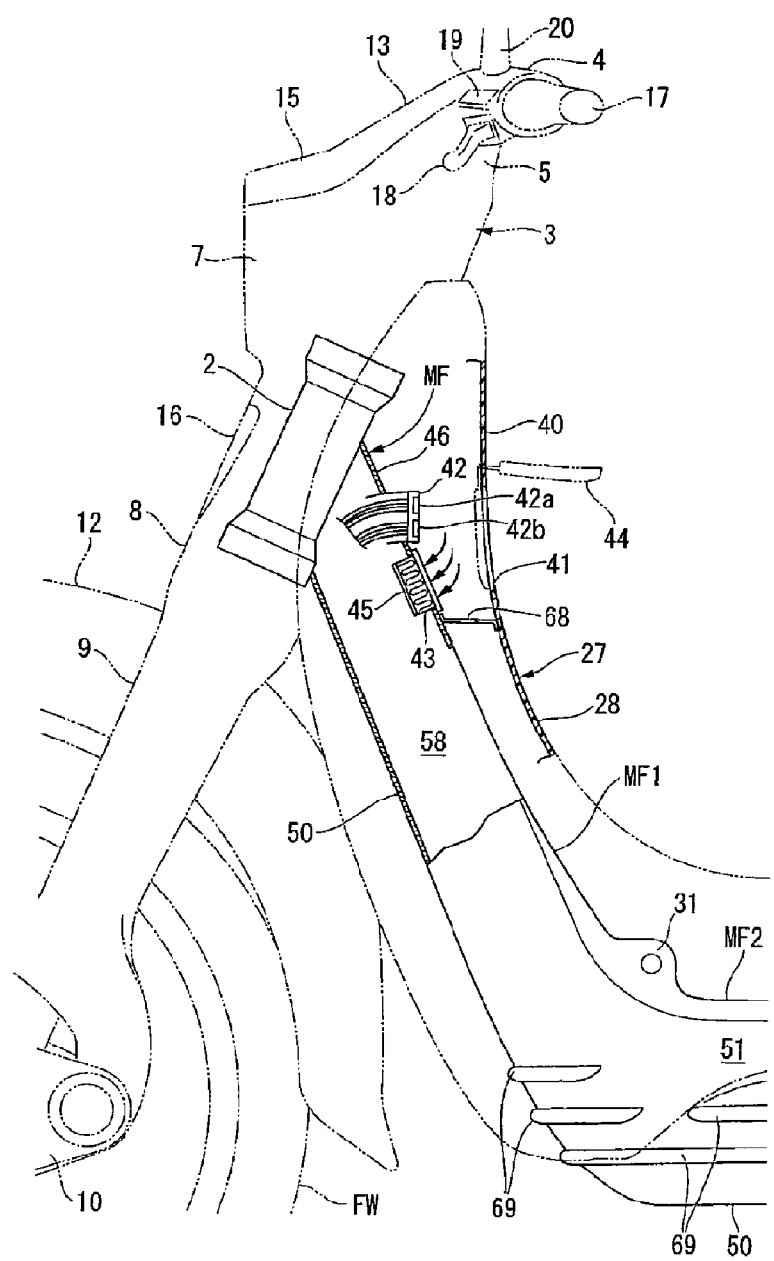
FIG. 8 is a magnified cross-sectional view of an upper portion of a front cover of the motorcycle according to the embodiment of this invention.

Referring also to FIG. 8, an opening 41 is made in a rear surface 40 of the front cover 28. A power supply connector 42 and a cooling air inlet 43 are provided in an upper wall part 46 of the front half section MF1 of the main frame member MF, and this power supply port is accessible through the opening 41. The power supply connector 42 is provided to charge later-described driving batteries 60 to 62, and the cooling air inlet 43 is provided to cool the driving batteries 60 to 62. The opening portion 41 is configured to be selectively openable and closable by a top-hinged lid 44. An air filter element 45 is attached to the cooling air inlet 43.

The rear cover 29 makes the bottom wall part 50 in the rear half section MF2 of the main frame member MF exposed downward. In addition, the rear cover 29 makes the respective sidewall parts 51 in the rear half section MF2 of the main frame member MF exposed under lower edge parts K2. The portions of the respective sidewall parts 51 are those which extend to the pivot part 23. The lower edge parts K2 continue to the respective lower edge parts K1, and extend horizontally rearward.

As a result, the main frame member MF functions as a vehicle body external appearance constituting member having external appearance design surfaces in the frontward-directed portion of the bottom wall part 50 in the front half section MF1, and the bottom wall part 50 in the rear half section MF2, as well as the exposed portions of the sidewall parts 51 which are situated under both the lower edge parts K1 of the front cover 28 and the lower edge parts K2 of the rear cover 28.

A rear end portion of the front cover 28 and a front end portion of the rear cover 29 constitute a straddling section M. Steps 47 are attached to the respective sidewall parts 51 of the main frame member MF in locations slightly rearward of a boundary portion between a rear end edge of the front cover 28 and a front end edge of the rear cover 29.

Rear turn indicator lights 49 are attached to left and right sidewalls 48 of the rear fender part 32. A tail light 54 is provided in a rear wall 53 of the rear fender part 32, and a number plate NP is provided under the tail light 54 in the rear wall 53. A luggage frame 56 supported by the supplemental frame section SF is attached to an upper wall 55 of the rear fender part 32. Furthermore, a main stand 57 is provided to a rear portion of the rear half section MF2 of the main frame member MF.

Figure 6:
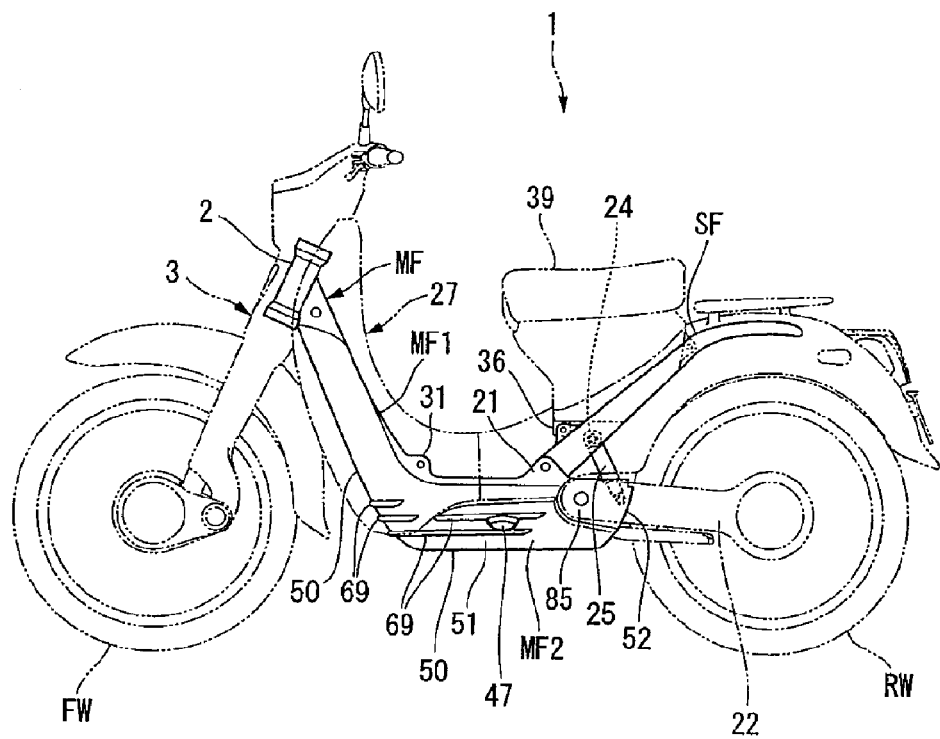
FIG. 6 is a left side view of a main frame member of the motorcycle according to the embodiment of this invention.
Figure 7:
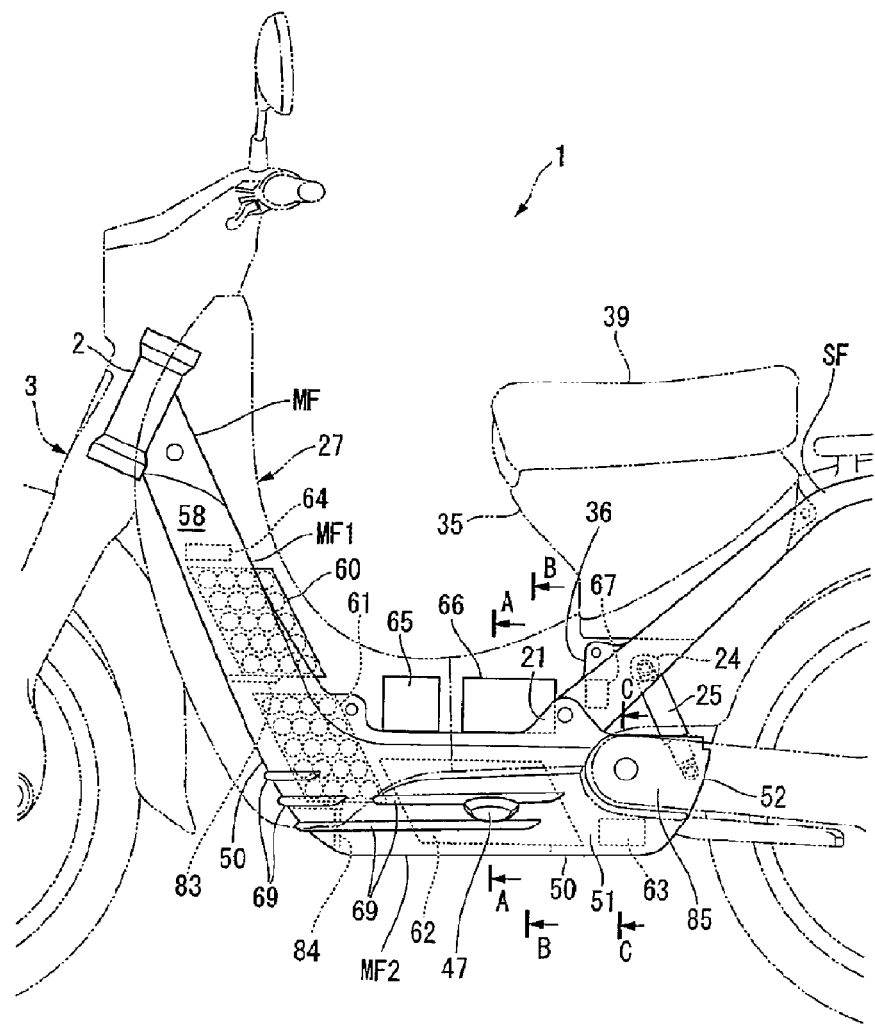
FIG. 7 is a diagram showing how parts are arranged around the main frame member in the motorcycle according to the embodiment of this invention.

As shown in FIGS. 6 to 8, the main frame member MF is a member: which includes the left and right sidewall parts 51, the bottom wall part 50, and a rear wall part 52; which has a space 58 inside; and which is opened upward. The main frame member MF includes: the front half section MF1 connected to the head pipe 2, and extending obliquely downward and rearward from the head pipe 2; and the rear half section MF2 extending rearward from the front half section MF1.

The driving batteries 60, 61 (FIG. 7) for supplying an electric power to the front wheel motor FM and the rear wheel motor RM are accommodated in the space 58 in the front half section MF1. The driving battery 62 for supplying an electric power to the front wheel motor FM and the rear wheel Motor RM is accommodated in a front portion of the space 58 in the rear half section MF2, and the 12-volt battery 63 for the accessories is accommodated in a rear portion of the space 58 in the rear half section MF2. Note that: these three driving batteries 60 to 62 are connected together in series; and the driving batteries 60 to 62 output 72V, for instance, to drive the front wheel motor FM and the rear wheel motor RM.

In this respect, a rear portion of each of the driving batteries 60, 61 accommodated in the space 58 in the front half section MF1 projects from the space 58. A battery control unit (BMU) 64 for managing charge and discharge of the driving batteries 60 to 62 is placed in an upper portion of the space 58 in the front half section MF1.

In an area over the rear half section MF2 of the main frame member MF, which is surrounded by the rear end portion of the front cover 28 of the vehicle body cover 27 and the front end portion of the rear cover 29 of the vehicle body cover 27, a voltage converter (DC-DC) 65 for lowering a voltage of the driving battery 62 and a motor driver unit (PDU) 66 for controlling the front wheel motor FM and the rear wheel motor RM are placed above the driving battery 62. The voltage converter 65 is installed in the rear end portion of the front cover 28 of the vehicle body cover 27. The motor driver unit 66 is installed in the front end portion of the rear cover 29 of the vehicle body cover 27. A cooling fan 67 (see FIG. 7) for drawing in cooling air through the cooling air inlet 43 (see FIG. 8) is installed in an area in the back of the motor driver unit 66 and under the storage box 35.

The sidewall parts 51 in the front half section MF1 of the main frame member MF, and an upper portion of the front half section MF1 are covered with the leg shield part 30 of the front cover 28. In contrast, the bottom wall part 50 in the front half section MF1 is exposed frontward.

As shown in FIG. 8, the upper wall part 46 is provided in a portion of the main frame member MF in a vicinity of a fixture part of the head pipe 2. The power supply connector 42 for charging the driving batteries 60 to 62 is provided in an upper portion of this upper wall part 46. The cooling air inlet 43, to which the air filter element 45 is attached, is provided in a widthwise center portion of the upper wall part 46 under the power supply connector 42. The power supply connector 42 and the cooling air inlet 43 are provided to face an installation area of the lid 44 for the opening 41 in the front cover 28 of the vehicle body 27, for electric charging and filter change operations.

Here, the power supply connector 42 has a quick charging port 42a, which is capable of carrying out the electric charging within a short time, in its upper side. In addition, the power supply connector 42 has a normal charging port 42b, which is capable of carrying out the electric charging by use of a household power source, in its lower side.

A partition wall 68, which includes a seal, is installed under the cooling air inlet 43. The partition wall 68 supports the front cover 28 from the back. In addition, the partition wall 68, together with the front cover 28, closes the space 58 in the main frame member MF. This partition wall 68 enables external air, which is introduced through the cooling air inlet 43, to be introduced to an inside of the front cover 28 which covers the space part 58 in the main frame member MF and the main frame member MF from the above, and an inside of the front end portion of the rear cover 29. The partition wall 68 further enables the thus-introduced external air to flow rearward.

Multiple projecting rails 69 are formed in an external wall of each sidewall part 51 in a lower portion of the front half section MF1 of the main frame member MF, and in an external wall of the sidewall part 51 in the rear half section MF2 of the main frame member MF. The projecting rails 69 project outwardly, and extend in the front-rear direction. The projecting rails 69 are provided mainly in the exposed portion of each sidewall part 51 in the rear half section MF2 of the main frame member MF. The step 47 is attached between the projecting rails 69 in each sidewall part 51.

Figure 9:
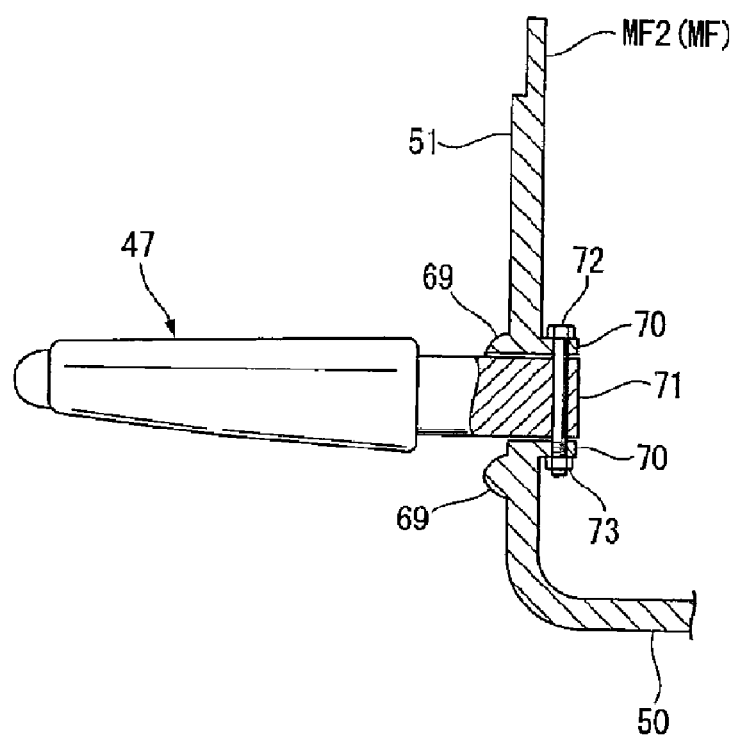
FIG. 9 is a cross-sectional view of the main frame member taken along the A-A line of FIG. 7.

As shown in FIG. 9, each step 47 is fixed by: interposing a base part 71 of the step 47 between upper and lower fixture seats 70, 70 which are provided on the back side of the corresponding sidewall part 51 of the main frame member MF; inserting a bolt 72 in the upper and lower fixture seats 70, 70 as well as the base part 71 of the step 47; and fastening the thus-inserted bolt 72 to a nut 73. Note that some projecting rails 69 are provided to each sidewall part 51 in a lower portion of the front half section MF1 and the bottom wall part 50 of the main frame member.

Figure 10:
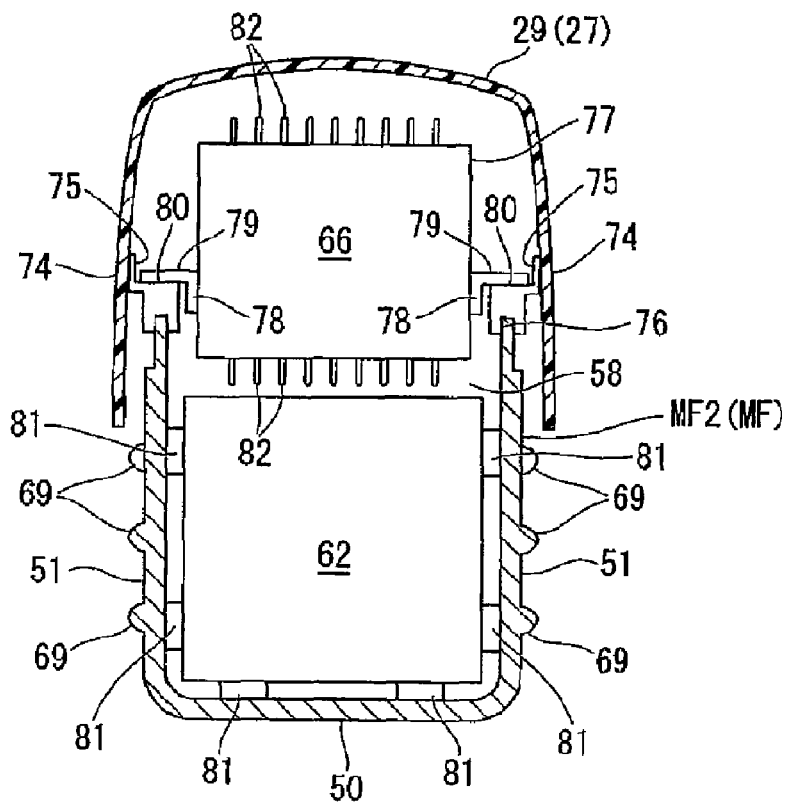
FIG. 10 is a cross-sectional view of the main frame member taken along the B-B line of FIG. 7.

FIG. 10 shows how the motor driver unit 66 placed above the driving battery 62 is accommodated inside the front end portion of the rear cover 29.

As shown in this drawing, rail brackets 75 are fixed to the back surfaces of left and right sidewalls 74 of the rear cover 29, respectively. Formed in the respective rail brackets 75 are engagement grooves 76 which are fitted from above to upper edges of the sidewall parts 51 in the rear half section MF2 of the main frame member MF. Meanwhile, support brackets 78 are fixed to sidewalls 77 of the motor driver unit 66, respectively. Flange parts 79 provided to the support brackets 78 are locked to fixture seat surfaces 80 of the rail brackets 75 of the rear cover 29, respectively.

Cushions 81 are placed on inner sides of the bottom wall part 50 and the sidewall parts 51 in the rear half section MF2 of the main frame member MF. The driving battery 62 is placed on, and fixed to, the inner sides of the bottom wall part 50 and the sidewall parts 51 with the cushions 81 being interposed in between. In addition, cooling fins 82 are formed on upper and lower surfaces of the motor drive unit 66. Thus, the motor driver unit 66 is effectively cooled by use of the cooling fins 82 with the cooling air: which is introduced by the cooling fan 67 through the cooling air inlet 43; and which thereafter flows in not only the space 58 in the main frame member MF, but also the inside of the rear cover 29. Note that the voltage converter 65 has the same support structure as does the motor driver unit 66, and if necessary, cooling fins 82 may be provided to the voltage converter 65 as in the case of the motor driver unit 66. For this reason, descriptions for the voltage converter 65 will be omitted.

Furthermore, as shown in FIG. 7, the two driving batteries 60, 61 accommodated in the space 58 in the front half section MF1 of the main frame member MF are respectively placed on, and fixed to, support parts 83, 84 provided to the bottom wall part 50 of the main frame member MF with cushions (not illustrated) being interposed in between.

Figure 11:
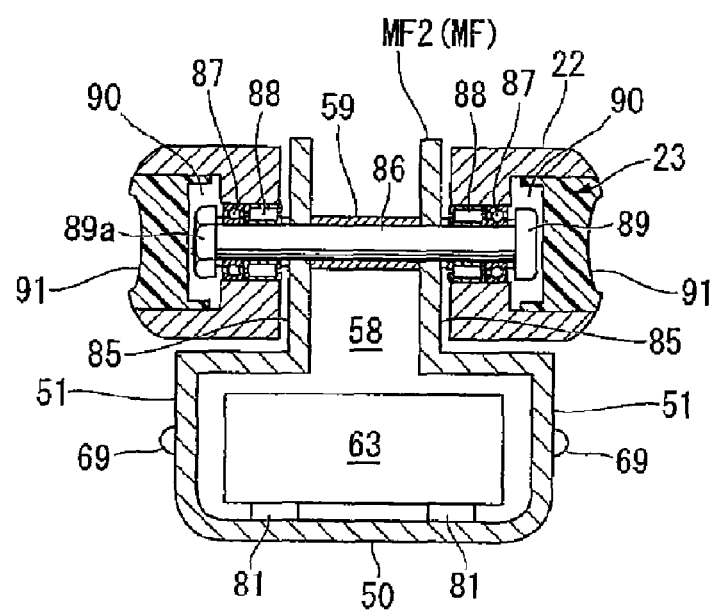
FIG. 11 is a cross-sectional view of the main frame member taken along the C-C line of FIG. 7.

FIG. 11 shows the pivot part 23 of the swing arm 22 and its vicinity. Recessed parts 85, 85 are provided in portions of the sidewall parts 51 that extend to the respective upper edge parts in the rear half section MF2 of the main frame member MF. A front end portion of the swing arm 22 is swingably supported by the recessed parts 85 by use of a pivot shaft 86. The pivot shaft 86 is inserted in the swing arm 22. Ball bearings 87 each functioning as a thrust bearing are provided to outer sides of the two end portions of the pivot shaft 86, respectively. Needle bearings 88 each functioning as a radial bearing are provided to inner sides of the two end portions of the pivot shaft 86, respectively. The swing arm 22 is swingably supported by the recessed parts 85 formed in the rear portions of the sidewall parts 51 in the rear half section MF2 of the main frame member MF, by use of a pivot shaft 86 rotatably supported by the ball bearings 87 and the needle bearings 88. Note that reference numeral 59 denotes a collar.

In this respect, portions of the swing arm 22 are accommodated in the respective recessed parts 85. This slims down the rear portion of the main frame member MF. In this embodiment, the swing arm 22 is accommodated in the recessed parts 85 half or more in the width direction of the swing arm 22. In this respect, a head part 89 of one end portion of the pivot shaft 86 and a nut 89a of the other end portion of the pivot shaft 86 are placed inside recess recessed parts 90, and are covered with caps 91 which are attached to the recess recessed parts 90, respectively. Note that the 12-volt battery 63 for the accessories is placed on, and fixed to, an area under the recessed parts 85 of the rear half section MF2 of the main frame member MF with cushions 81 being interposed in between.

In this embodiment, portions of the bottom wall part 50 of the main frame member MF and portions of each sidewall part 51 of the main frame member MF, which correspond to the rear half section MF2, are exposed, and are thus used as design accents. Meanwhile, once the front cover 28 and the rear cover 29 placed over the main frame member MF are removed, an upper area of the main frame member MF is exposed, and the space 58 is accordingly exposed. This makes it possible to service and maintain components stored inside of the main frame member.

Specifically, maintenance can be easily provided to the driving batteries 60 to 62 for supplying the electric power to the front wheel motor FM and the rear wheel motor RM. In addition, because the driving batteries 60 to 62 are placed in a protected space surrounded by the main frame member MF, and covered by the vehicle body cover 27, the driving batteries 60 to 62 are protected from outside weather conditions, including rain, snow and splashed water, during normal use of the vehicle.

Furthermore, the vehicle body cover 27 covers from above the upper area of the main frame member MF and the parts of the left and right sidewall parts 51 of the main frame member MF, that is to say, a portion of the main frame member MF above the lower edge parts K1 of the front cover 28 and the lower edge parts K2 of the rear cover 29. As a result, external appearance design surfaces of the main frame member MF are set up in the lower area of the main frame member MF, which is less likely to be seen than the upper part of the motorcycle. Hence, costs for performing surface finishing on the exposed portions of the main frame member MF can be kept lower than when external appearance design surfaces of the main frame member MF are set up in the upper area of the main frame member MF.

By providing the multiple projecting rails 69, which project outward and extend in the front-rear direction, to the external surfaces of the left and right sidewall parts 51 of the main frame member MF, the strength of the main frame member MF is enhanced, and the radiation of heat from the driving batteries 61, 62 accommodated inside the main frame member MF is facilitated by the multiple projecting rails 69, which function as heat radiation fins. In other words, the bottom wall part 50 in the front half section MF1 and the rear half section MF2 of the main frame member MF are exposed to the outside, and the part of each sidewall part 51 in the rear half section MF2 is exposed to the outside. For these reasons, the driving batteries 60 to 62 accommodated inside the main frame member MF are cooled more effectively than when these are not exposed to the outside. The multiple projecting rails 69 enhance this cooling effect.

Moreover, because in the rear half section MF2 of the main frame member MF, the motor driver unit 66 and the voltage converter 65 are placed above the driving batteries 61, 62 accommodated in the rear half section MF2 of the main frame member MF, the motor driver unit 66, the driving batteries 61, 62, and the voltage converter 65, which are all heat-producing members, can be cooled simultaneously.

Additionally, because the parts of the swing arm 22 are accommodated in the respective recessed parts 85 of the rear half section MF2 of the main frame member MF, the motorcycle 1 can be made compact in the widthwise direction, and a slim design can be realized.

In addition, the number of parts can be reduced, because the vehicle body cover 27 for covering the main frame member MF includes only the two parts, that is, the front cover 28 and the rear cover 29.

Further, only by opening the lid 44 provided to the rear surface 40 of the front cover 28, the electric charging can be carried out by use of the power supply connector 42, and the air filter element 45, in the cooling air inlet 43, can be changed easily. For this reason, the ease of maintenance is enhanced.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention. The invention can be applied to, for instance, an electric motorcycle configured in that only the rear wheel is driven.

We claim:
1. A motorcycle comprising:
   a head pipe;
   a main frame member having a front section extending downwardly and rearwardly from the head pipe, and a horizontal section extending rearwardly from a lower end of this front section, the main frame member comprising left and right sidewall parts and a bottom wall part which cooperate to form a protected space which is opened upwardly;
   a vehicle body cover covering part of the main frame member,
   a front wheel and a rear wheel, at least one of which is a driving wheel;
   a swing arm operatively attached to the main frame member for rotatably supporting the rear wheel;
   an electric motor for imparting a driving force to the driving wheel; and
   a battery for supplying an electric power to the motor, wherein the battery is accommodated in the protected space formed by the left and right sidewall parts and the bottom wall part of the main frame member;
   wherein:
     recessed parts for accommodating portions of the swing arm are provided in the sidewall parts in the horizontal section of the main frame member, respectively;
     a pivot part for swingably supporting the swing arm is provided extending through the recessed parts;
     the vehicle body cover is provided to cover, from above, the protected space formed between the main frame member and a portion of each of the left and right sidewall parts;
     and a lower portion of the horizontal section is exposed to the outside as an external appearance design surface.

2. The motorcycle according to claim 1, wherein a plurality of projecting rails are provided on an external side wall of each of the left and right sidewall parts, the projecting rails each projecting outwardly and extending in a front-rear direction.

3. The motorcycle according to claim 2, further comprising:
a motor driver unit for controlling the electric motor; and
a voltage converter for lowering a voltage of the battery, wherein
the motor driver unit and the voltage converter are placed above the battery which is accommodated in the horizontal section of the main frame member.

4. The motorcycle according to claim 1, wherein the vehicle body cover comprises a front cover for covering the front section and portions of the horizontal section of the main frame member; and a rear cover for covering other portions of the horizontal section.

5. The motorcycle according to claim 4, wherein:
an opening is made in a rear surface of the front cover;
a power supply connector, for use in charging the battery, and a cooling air inlet for cooling the battery are provided in a location which is accessible via the opening; and
an openable and closable lid is provided for selectively covering the opening.

6. The motorcycle according to claim 1, further comprising:
a motor driver unit for controlling the electric motor; and
a voltage converter for lowering a voltage of the battery, wherein
the motor driver unit and the voltage converter are placed above the battery which is accommodated in the horizontal section of the main frame member.

7. A motorcycle comprising:
a head pipe;
a main frame member having a front section extending downwardly and rearwardly from the head pipe, and a horizontal section extending rearwardly from a lower end of this front section;
a vehicle body cover covering part of the main frame member,
a front wheel and a rear wheel, at least one of which is a driving wheel;
an electric motor for imparting a driving force to the driving wheel; and
a battery for supplying an electric power to the motor,
wherein the main frame member comprises left and right sidewall parts and a bottom wall part which cooperate to form a protected space which is opened upwardly, the battery disposed in the protected space;
wherein the vehicle body cover is provided to cover, from above, the protected space formed between the main frame member and a portion of each of the left and right sidewall parts; and
wherein a lower portion of the horizontal section is exposed to the outside as an external appearance design surface.

8. The motorcycle according to claim 7, wherein a plurality of projecting rails are provided on an external side wall of each of the left and right sidewall parts, the projecting rails each projecting outwardly and extending in a front-rear direction.

9. The motorcycle according to claim 8, further comprising a swing arm operatively attached to the main frame member for rotatably supporting the rear wheel, wherein:
recessed parts for accommodating portions of the swing arm are provided in the sidewall parts in the horizontal section of the main frame member, respectively; and
a pivot part for swingably supporting the swing arm is provided extending through the recessed parts.

10. The motorcycle according to claim 8, further comprising:
a motor driver unit for controlling the electric motor; and
a voltage converter for lowering a voltage of the battery, wherein
the motor driver unit and the voltage converter are placed above the battery which is accommodated in the horizontal section of the main frame member.

11. The motorcycle according to claim 7, further comprising a swing arm operatively attached to the main frame member for rotatably supporting the rear wheel, wherein:
recessed parts for accommodating portions of the swing arm are provided in the sidewall parts in the horizontal section of the main frame member, respectively; and
a pivot part for swingably supporting the swing arm is provided extending through the recessed parts.

12. The motorcycle according to claim 11, further comprising:
a motor driver unit for controlling the electric motor; and
a voltage converter for lowering a voltage of the battery, wherein
the motor driver unit and the voltage converter are placed above the battery which is accommodated in the horizontal section of the main frame member.

13. The motorcycle according to claim 7, wherein the vehicle body cover comprises a front cover for covering the front section and portions of the horizontal section of the main frame member; and a rear cover for covering other portions of the horizontal section.

14. The motorcycle according to claim 7, further comprising:
a motor driver unit for controlling the electric motor; and
a voltage converter for lowering a voltage of the battery, wherein
the motor driver unit and the voltage converter are placed above the battery which is accommodated in the horizontal section of the main frame member.

15. The motorcycle according to claim 7, wherein:
an opening is made in a rear surface of the front cover;
a power supply connector, for use in charging the battery, and a cooling air inlet for cooling the battery are provided in a location which is accessible via the opening; and
an openable and closable lid is provided for selectively covering the opening.

* * * * *